(12) United States Patent
Hofmann et al.

(10) Patent No.: US 6,276,505 B1
(45) Date of Patent: Aug. 21, 2001

(54) MULTI-DISK CLUTCH

(75) Inventors: Klaus Hofmann, Leutershausen; Horst Friedrich, Happertshausen, both of (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/312,527

(22) Filed: May 14, 1999

(30) Foreign Application Priority Data

May 14, 1998 (DE) .............................................. 198 21 645

(51) Int. Cl.$^7$ .................................................. F16D 13/50
(52) U.S. Cl. .................................... 192/70.27; 192/70.25; 192/89.24
(58) Field of Search .............................. 192/70.27, 70.25, 192/70.12, 89.25, 89.24; 267/161–163, 181

(56) References Cited

U.S. PATENT DOCUMENTS

| | | | |
|---|---|---|---|
| 4,633,990 | * 1/1987 | Fukutake et al. | 192/70.27 |
| 4,680,847 | 7/1987 | Bauer | 29/173 |
| 4,747,586 | * 5/1988 | Reik | 267/161 |
| 4,802,564 | 2/1989 | Stodt | 192/70.28 |
| 4,844,226 | * 7/1989 | Taketani | 192/111 A |
| 4,886,153 | * 12/1989 | Takenaka et al. | 192/113 A |
| 5,878,857 | * 3/1999 | Fukuda et al. | 192/70.27 |

FOREIGN PATENT DOCUMENTS

| | | | |
|---|---|---|---|
| 3304671 | * 8/1984 | (DE) | 192/70.27 |
| 693 13 264 | 6/1994 | (DE) | . |
| 195 45 972 | 6/1997 | (DE) | . |
| 627 051 B1 | 12/1994 | (EP) | . |
| 812 998 A1 | 12/1997 | (EP) | . |
| 2 307 958 | 11/1997 | (GB) | . |

* cited by examiner

*Primary Examiner*—Sherry Estremsky
*Assistant Examiner*—Tisha D. Lewis
(74) *Attorney, Agent, or Firm*—Cohen, Pontani, Lieberman & Pavane

(57) ABSTRACT

A multi-disk clutch having a housing with a toothed ring and a cover connected to the toothed ring. The toothed ring, on an inner circumferential surface, has a plurality of disk carrier teeth distributed in the circumferential direction. At least one outer disk engages, of an external toothing, with the disk carrier teeth on the toothed ring. At least one inner disk is connected in rotation-proof fashion to a coupling hub. The clutch further has a pressure plate, and an energy storage device. The energy store device, in an outer circumferential area, has a recess associated with at least one disk carrier tooth that opens substantially radially outward and the disk carrier tooth engages in the recess.

10 Claims, 2 Drawing Sheets

MULTI-DISK CLUTCH

BACKGROUND OF THE INVENTION

1. Field of the Invention

The present invention relates to a multi-disk clutch, comprising a housing with a toothed ring and a cover connected to the toothed ring. The toothed ring, on an inner circumferential surface, has a plurality of disk carrier teeth distributed in the circumferential direction. At least one outer disk engages, by means of an external toothing, with the disk carrier teeth on the toothed ring. At least one inner disk is connected in rotation-proof fashion to a coupling hub. The clutch also has a pressure plate, and an energy storage device, preferably a diaphragm spring, which rests on the housing, on one side, and on the pressure plate, on the other, and prestresses the pressure plate in the direction of the outer or inner disks.

2. Discussion of the Prior Art

A multi-disk clutch with a structure of this type is known from German reference DE 195 45 972 A1. In that multi-disk clutch, which is of the pressed type, the diaphragm spring is held in a radially central area on the cover of the housing of the multi-disk clutch by means of a plurality of spacing bolts and with the intermediate mounting of wire rings or the like. The diaphragm spring is thus secured, relative to the housing, against movement in the circumferential and radial directions. One problem with this arrangement is that the spacing bolts penetrate the diaphragm spring exactly in the area that, in view of the pressure force produced by the diaphragm spring, is critical in terms of stress. Thus, when relatively large openings must be provided in the diaphragm spring for the spacing bolts, the force characteristic of the diaphragm spring can be disadvantageously impaired.

Furthermore, in the case of drawn clutches wherein diaphragm springs rest in their radial outer area on the housing cover, it is known to secure the diaphragm springs against rotation on the pressure plate by means of either clamping pins or so-called "fingers" in the housing cover. Securing the diaphragm springs by means of clamping pins or "fingers" formed on the housing requires a relatively large structural space and results in vibrating-friction wear at the contact points of the individual components.

Further, from European reference EP 0 627 051 B1, which discloses a non-generic clutch, a drawn-type clutch is known in which the diaphragm spring is secured in its position in its radially outer area by means of a tilt surface made of elastic material, which surrounds the diaphragm spring on the housing. Providing this tilt surface increases the number of parts and thus makes the assembly process more difficult.

SUMMARY OF THE INVENTION

The object of the present invention is to provide a multi-disk clutch in which the energy storage device can be secured in its position in the clutch simply and without impairing the force characteristic of the energy storage device.

According to the invention, this object is attained by means of a multi-disk clutch that comprises a housing with a toothed ring and a cover connected to the toothed ring, whereby the toothed ring, on an inner circumferential surface, has a plurality of disk carrier teeth distributed in the circumferential direction. At least one outer disk engages, by means of an external toothing, with the disk carrier teeth on the toothed ring. At least one inner disk is connected in rotationproof fashion to a coupling hub. The clutch further has a pressure plate, and an energy storage device, preferably a diaphragm spring, which rests on the housing, on one side, and on the pressure plate, on the other, and prestresses the pressure plate in the direction of the outer or inner disks.

Further, in the multi-disk clutch according to the invention, the energy storage device, in an outer circumferential area, has a recess associated with at least one disk carrier tooth, which recess is open substantially toward the radial outside and into which the disk carrier tooth engages.

The engagement of at least one disk carrier tooth into an associated recess creates a simple means of securing the position of the diaphragm spring, especially against rotation, in the housing, without any additional components being necessary.

Advantageously, the breadth of the recess in the circumferential direction corresponds substantially to the breadth of the disk carrier tooth in the circumferential direction.

Wear in the contact area between the energy storage device and the disk carrier tooth can be kept very low when a contour of the recess corresponds, at least area-wise, to a cross-sectional contour of the disk carrier tooth.

Because such disk carrier teeth generally narrow toward the radial inside, the recess is preferably enlarged toward the radial outside.

When, further, a bottom area of the recess rests on an inner surface of the disk carrier teeth or is located at a short distance therefrom, care must also be taken to prevent undesired movement of the energy storage device in the radial direction. Here, a "short distance" is one that permits the function of protecting against radial movement to be fulfilled, but at the same time allows the pivoting movement needed to engage and disengage the clutch to be carried out without hindrance.

To embody the rotational coupling between the energy storage device and the housing in a stable manner and, in particular, to prevent undesired radial movement by the energy storage device relative to the housing as well as possible, in another embodiment of the invention at least every second disk carrier tooth, and preferably every carrier tooth, has a recess associated with it.

The above-described embodiment is especially advantageous in the case of multi-disk clutches of the drawn type. When, in such an embodiment, care is taken to ensure that the energy storage device rests on the cover in a radial area close to the recess(es), the pivoting movement of the energy storage device during engagement and disengagement procedures will be minimized in the area of the energy storage device that engages with the disk carrier teeth, specifically, in a longitudinal direction of the disk carrier teeth. As a result, the wear occurring in this area due to reciprocal friction will also be very low.

The present invention further relates to a diaphragm spring, especially for a multi-disk clutch, whereby the diaphragm spring is embodied in a substantially disk-like fashion and, on an outer circumferential area, has at least one recess to accommodate a carrier tooth.

In the diaphragm spring according to the invention, care is taken to ensure that the positionsecuring components can be embodied integrally with the diaphragm spring. It is therefore proposed that the diaphragm spring be stamped from a material blank and subjected as needed to subsequent deformation, hardening or the like.

It should be pointed out that the diaphragm spring according to the invention can have at least one of the features that are described above in reference to the multi-disk clutch according to the invention and relate specifically to energy storage.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
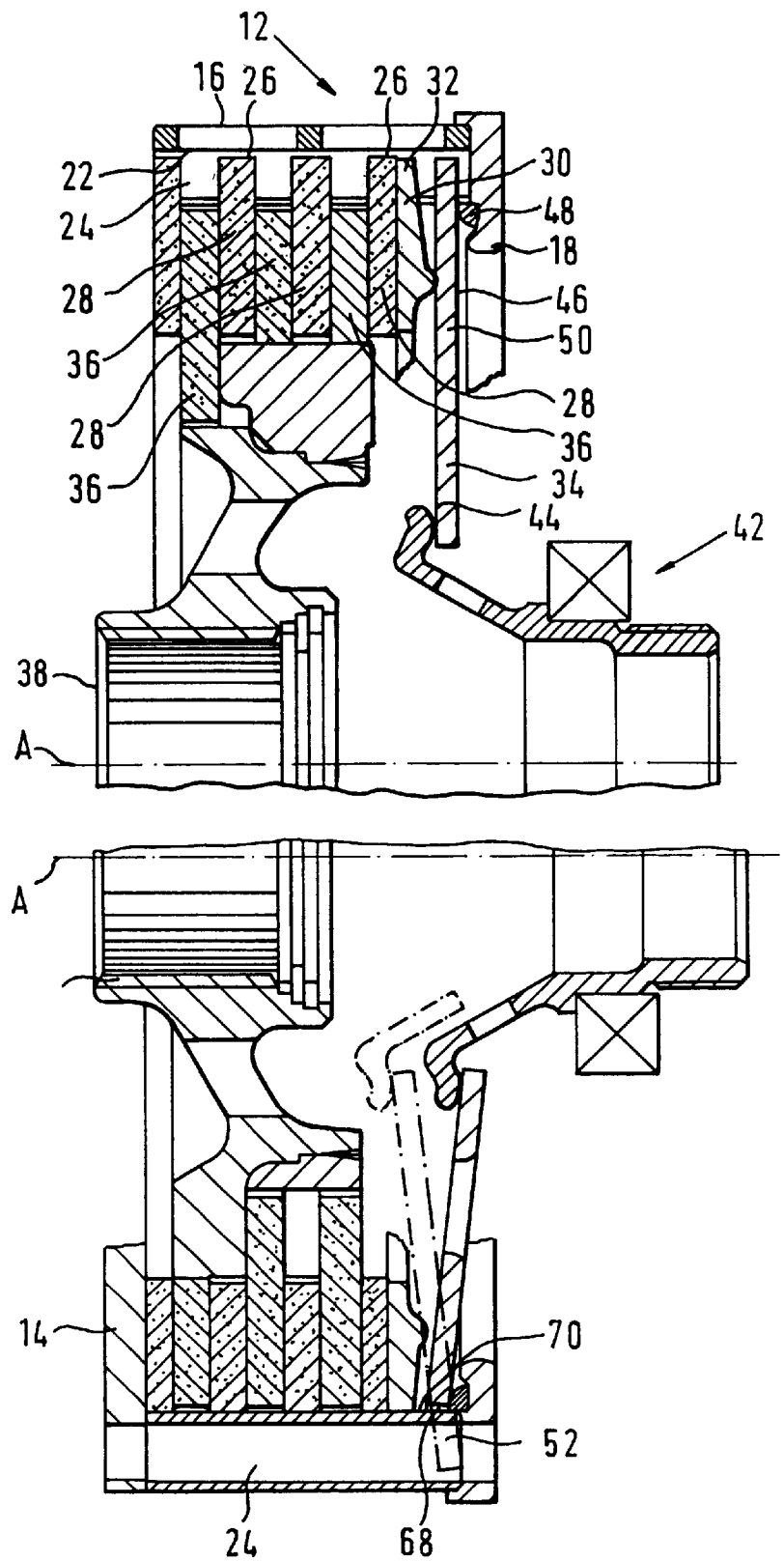
FIG. 1 is a longitudinal section through a multi-disk clutch according to the invention.

FIG. 1 shows a longitudinal section of a multi-disk clutch according to the invention. The multi-disk clutch 10 consists of a housing 12 that comprises a flywheel 14, a toothed ring 16 and a cover 18. The flywheel 14 can be screwed by a plurality of bolts to a drive shaft, e.g., a crank shaft of an internal combustion engine, so that the housing 12 driven by said drive shaft is driven, after being integrated into the drive system, around a rotational axis A.

The toothed ring 16 has a plurality of disk carrier teeth 24 distributed in the circumferential direction on its inner circumferential surface 22 and extending in a ring longitudinal direction that corresponds to the extension direction of the axis A. External tooth systems 26 of outer disks 28, four of which are shown in FIG. 1, engage into the disk carrier teeth 24. The outer disks 28 are thus connected in rotation-proof fashion to the housing 12, but can move relative to the housing 12 in the axial direction. A pressure plate 30 is also connected in rotation-proof fashion to the housing 12 via an external toothing 32, but can be moved in the axial direction. An energy storage device, here, a diaphragm spring 34, acts between the pressure plate 30 and the cover 18. The diaphragm spring 34 presses the pressure plate 30 against the outer disks 28, so that the pressure plate 30 in turn presses the outer disks 28, together with inner disks 36 arranged between the outer disks 28, in the direction of the flywheel 14. This pressing establishes a torque transmission connection between the outer disks 28 connected in rotation-proof fashion to the housing 12 and the inner disks 36 connected in rotation-proof fashion to the hub 38. For this purpose, the inner disks 36 have an internal tooth system, which engages with a corresponding external tooth system of the hub 38. The hub 38 also has an inner tooth system 40, by means of which the hub 38 can be brought into rotary engagement with a clutch output shaft, generally a gear input shaft.

As FIG. 1 shows, the depicted multi-disk clutch 10 is a drawn-type clutch, in which a disengagement mechanism 42 acts on the radially inner area 44 of the diaphragm spring 34 and moves the diaphragm spring 34, for the purpose of implementing disengagement procedures, away from the flywheel 14 in the radially inner area 44, as shown in the lower part of FIG. 1 by a solid line. The upper half of the drawing shows the engaged position of the diaphragm spring 34 and multi-disk clutch 10. In its radially outer area 46, the diaphragm spring 34 rests via a support ring 48 on the cover 18. In its radially central area 50, the diaphragm spring 34 presses against the pressure plate 30.

Figure 2:
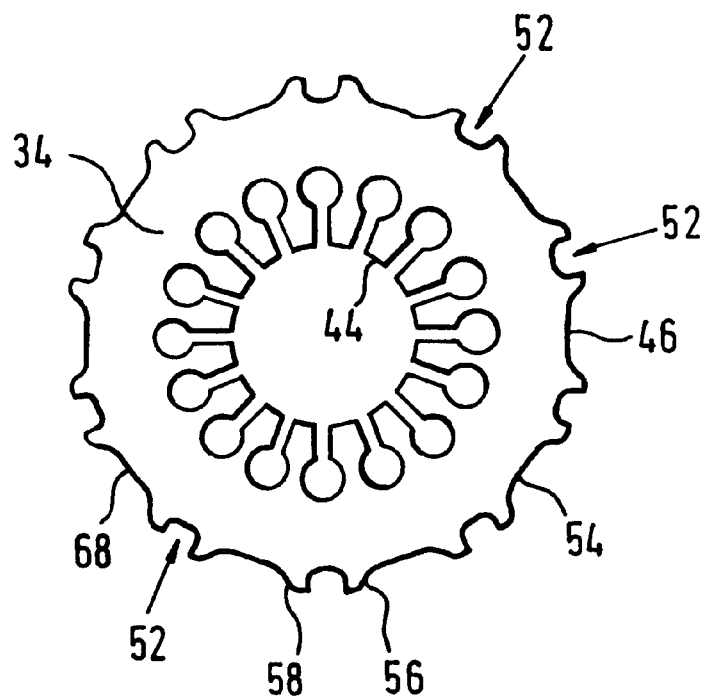
FIG. 2 is an axial view of a diaphragm spring according to the invention.
Figure 3:
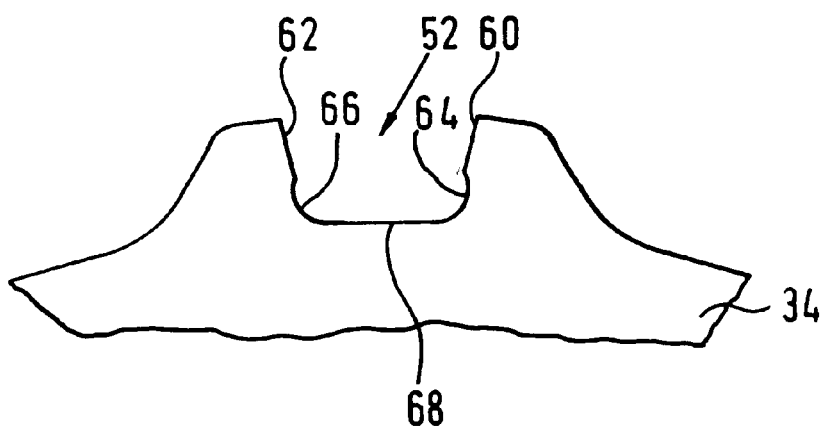
FIG. 3 is an enlarged area of the diaphragm spring shown in FIG. 2.

Further, as especially FIGS. 2 and 3 show, the diaphragm spring 34 has a plurality of recesses 52 in its radially outer area 46. The recesses 52 are distributed in the circumferential direction and open toward the radial outside. The recesses 52 correspond to the respective disk carrier teeth 24, so that, in the assembled state of the multi-disk clutch 10, a disk carrier tooth 24 engages into each recess 52. The arrangement is preferably such that each disk carrier tooth 24 is associated with a recess 52. As the drawing shows, the recesses 52 are limited by projections 56, 58, which project radially outward past a base circumferential line 54 of the diaphragm spring 34. Thus, material and weight can be saved, particularly in the radially outer area 46 of the diaphragm spring 34 that substantially contributes to the inertial moment. The contour of the recesses 52 is more clearly shown in FIG. 3. It can be seen that the contour expands radially outward, in an area-wise fashion, on flanks 60, 62, which transit into a recess bottom 68 via approximately circular sections 64, 66. The contour of the recesses 52 can be such that the slant of the flanks 60, 62 is substantially adjusted to the shape of the disk carrier teeth 24, which narrow toward the radial inside, so that an accurate fit between the diaphragm spring 34 and the disk carrier teeth 24 is obtained, along with corresponding accuracy in securing the circumferential and radial positions of the diaphragm spring 34. The rounded areas 66, 64 in transition to the recess bottom 68 prevent stress peaks from occurring in corners or the like. Further, as FIG. 1 shows, the bottom is held close to an inner surface 70 of the disk carrier teeth 24, so that great accuracy is attained in securing the radial position of the diaphragm spring 34. The arrangement can be such that the bottom 68 rests on the inner surface 70, so that the entire diaphragm spring 34 is held under slight tension in the housing 12. However, a small space can nonetheless be created between the bottom 68 and the inner surface 70, so that even though the radial position is adequately secured, the diaphragm spring 34 can move freely in this area relative to the disk carrier teeth 24.

Further, it is possible for the contour of the diaphragm spring 34 to be such that the disk carrier teeth 24 come into contact with the diaphragm spring 34 only in the areas that correspond to the bend-like transitions from the flanks 60, 62 to the circular sections 64, 66. The size of the contact area can thus be reduced.

It is of great significance that in the present invention the movement of the diaphragm spring 34 relative to the disk carrier teeth that occurs in the area of the recesses 52 during the pivoting movement of the diaphragm spring 34 is very slight, because the diaphragm spring 34, in the radial area of the recesses 52 (i.e., directly radially inside these recesses 52), rests via the support ring 48 on the cover 18. The relative movements occurring during engagement and disengagement procedures are therefore very minor, resulting in correspondingly minor frictional wear in this area.

It can be seen that the multi-disk clutch according to the invention requires no additional components to secure the diaphragm spring 34 against movement in the circumferential and radial directions. This function is performed by the existing disk carrier teeth 24 in interaction with the recesses 52 on the diaphragm spring 34. Because the basic form of the diaphragm spring 34 is generally produced in a stamping process, the recesses 52, i.e., the projections 58, 56 limiting these recesses 52, can be simultaneously produced on the diaphragm spring 34 during this stamping process. Thus, not even one additional work step is needed to integrate the discussed movement-securing functions for the diaphragm spring 34 into the multi-disk clutch 10.

It can further be seen that in the multi-disk clutch according to the invention, i.e., in the diaphragm spring according to the invention, the movement protection function for the diaphragm spring 34 is located in the radial outer area, which is not critical with respect to the force characteristic of the diaphragm spring 34. That is, the provision of the recess 52 or the projections 56, 58 does not impair the form of the diaphragm spring 43 in the area that is critical in terms of the force or stress characteristic, so that the spring characteristic of the diaphragm spring is not impaired by integration of the movement protection function.

The invention is not limited by the embodiments described above which are presented as examples only but can be modified in various ways within the scope of protection defined by the appended patent claims.

What is claimed is:

1. A mutli-disk clutch, comprising:
    a housing having a toothed ring and a cover connected to the toothed ring, the toothed ring having an inner circumferential surface with a plurality of disk carrier teeth distributed in a circumferential direction;
    at least one outer disk having an external toothing that engages with the disk carrier teeth on the toothed ring;
    a coupling hub;
    at least one inner disk connected in rotation-proof fashion to the coupling hub;
    a pressure plate; and
    an energy storage device having one side that rests on the housing and another side that rests on the pressure plate so as to prestress the pressure plate in a direction of one of the outer disk and the inner disk, the energy storage device having an outer circumferential area with a recess associated with at least one disk carrier tooth of the disk carrier teeth, the recess being configured to open substantially radially outwardly and the disk carrier tooth engaging in the recess so as to prevent rotation of the energy storage device, the recess being further configured to enlarge radially outwardly.

2. A multi-disk clutch as defined in claim 1, wherein the recess is formed to have a breadth in the circumferential direction that corresponds substantially to a breadth of the disk carrier tooth in the circumferential direction.

3. A multi-disk as defined in claim 1, wherein the recess has a contour that corresponds at least area-wise to a cross-sectional contour of the disk carrier tooth.

4. A multi-disk clutch as defined in claim 1, wherein the recess has a bottom area that rests on an inner surface of the disk carrier tooth.

5. A multi-disk clutch as defined in claim 1, wherein the recess has a bottom area, the disk carrier having an inner surface arranged a short distance from the bottom area of the recess.

6. A multi-disk clutch as defined in claim 1, wherein the recess is formed by two projections that project radially outward past a base outer circumferential line of the energy storage device.

7. A multi-disk clutch as defined in claim 1, wherein the energy storage device has a plurality of recesses, a respective one of the recesses being associated with at least every second disk carrier tooth.

8. A multi-disk clutch as defined in claim 1, wherein the multi-disk clutch is a drawn clutch.

9. A multi-disk clutch as defined in claim 8, wherein the energy storage device rests on the cover in an area close to the recess.

10. A multi-disk clutch as defined in claim 1, wherein the energy storage device includes a diaphragm spring with a disk-shaped body.

* * * * *